United States Patent
Gruner et al.

(10) Patent No.: US 7,206,885 B2
(45) Date of Patent: Apr. 17, 2007

(54) VARIABLE FIELD BUS COUPLING WITH LONG COUPLING LENGTH, PARTICULAR FOR MOBILE OPERATOR CONTROL AND MONITORING DEVICES

(75) Inventors: Wolfgang Gruner, Nürnberg (DE); Gottfried Rieger, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/511,022

(22) PCT Filed: Mar. 31, 2003

(86) PCT No.: PCT/DE03/01055

§ 371 (c)(1),
(2), (4) Date: Oct. 8, 2004

(87) PCT Pub. No.: WO03/088567

PCT Pub. Date: Oct. 23, 2003

(65) Prior Publication Data
US 2005/0165993 A1    Jul. 28, 2005

(30) Foreign Application Priority Data
Apr. 12, 2002    (DE)    ............... 202 05 701 U

(51) Int. Cl.
*G06F 13/00*    (2006.01)
(52) U.S. Cl. ............ 710/300; 710/104; 370/270; 361/62; 340/286.02; 701/29
(58) Field of Classification Search ........ 710/300, 710/8, 10, 100, 302; 701/29; 712/300; 370/216, 370/402; 361/62; 340/310.11; 709/227; 713/300; 324/538; 375/258; 398/141; 439/620; 307/140

See application file for complete search history.

(56) References Cited

U.S. PATENT DOCUMENTS

| | | | | | |
|---|---|---|---|---|---|
| 5,081,648 | A | * | 1/1992 | Herzog | 375/258 |
| 5,163,048 | A | * | 11/1992 | Heutink | 370/402 |
| 5,796,185 | A | * | 8/1998 | Takata et al. | 307/140 |
| 5,805,052 | A | * | 9/1998 | Hansemann et al. | 340/310.11 |
| 5,920,197 | A | * | 7/1999 | Price et al. | 324/538 |
| 5,922,060 | A | * | 7/1999 | Goodrum | 710/302 |
| 6,128,661 | A | * | 10/2000 | Flanagin et al. | 709/227 |
| 6,138,194 | A | * | 10/2000 | Klein et al. | 710/302 |
| 6,233,509 | B1 | * | 5/2001 | Becker | 701/29 |
| 6,302,741 | B1 | * | 10/2001 | Fasold et al. | 439/620 |
| 6,363,437 | B1 | * | 3/2002 | Ptasinski et al. | 710/10 |
| 6,385,667 | B1 | * | 5/2002 | Estakhri et al. | 710/8 |
| 6,466,539 | B1 | * | 10/2002 | Kramer et al. | 370/216 |
| 6,577,230 | B1 | * | 6/2003 | Wendt et al. | 375/258 |
| 6,587,901 | B2 | * | 7/2003 | Nishikawa et al. | 710/100 |

(Continued)

FOREIGN PATENT DOCUMENTS

| | | |
|---|---|---|
| DE | 197 10 137 A1 | 10/1997 |
| DE | 199 60 471 A1 | 3/2001 |

(Continued)

*Primary Examiner*—Christopher E. Lee

(57) ABSTRACT

The invention relates to a system for coupling a mobile data input unit to a field bus, whereby a coupling unit is connected to the field bus via a spur line and a line driver and the signals at the output of the line driver are supplied to a coupling link or received from the latter via first level converters. The mobile data input unit receives the signals from the coupling link or supplies them to the latter via second level converters.

4 Claims, 4 Drawing Sheets

U.S. PATENT DOCUMENTS

| | | | |
|---|---|---|---|
| 6,614,634 B1 * | 9/2003 | Westerfeld et al. | 361/62 |
| 6,694,439 B2 * | 2/2004 | Cho et al. | 713/300 |
| 6,751,740 B1 * | 6/2004 | Robertson et al. | 713/300 |
| 6,950,610 B2 * | 9/2005 | Lee | 398/141 |

FOREIGN PATENT DOCUMENTS

| | | |
|---|---|---|
| EP | 0 483 548 A1 | 5/1992 |
| WO | WO 02/056545 A2 | 7/2002 |

* cited by examiner

VARIABLE FIELD BUS COUPLING WITH LONG COUPLING LENGTH, PARTICULAR FOR MOBILE OPERATOR CONTROL AND MONITORING DEVICES

CROSS REFERENCE TO RELATED APPLICATIONS

This application is the US National Stage of International Application No. PCT/DE03/01055, filed Mar. 31, 2003 and claims the benefit thereof. The International Application claims the benefits of German application No. 20205701.1 filed Apr. 12, 2002, both of the applications are incorporated by reference herein in their entirety.

FIELD OF INVENTION

The invention relates to a variable connection of mobile data units to a field bus, more specifically of mobile handheld controllers. These may be used, for example, in industrial applications for controlling and operating production plant and machinery.

BACKGROUND OF INVENTION

In modern industrial plant, particularly automated production facilities, mobile operator control and monitoring systems are required. These are not tied to a specific site, but can be plugged in at changeable locations as and when required. Moreover, in the case of industrial systems, field buses must be regarded as the standard for networked computer systems. It is therefore important for the user to have an easy means of connecting mobile operator control and monitoring devices to field buses.

SUMMARY OF INVENTION

The invention relates to an advantageous embodiment of so-called "access points" which are used as data system docking stations for the mobile operator control and monitoring devices, also known as BuB systems (BuB is the German acronym for "Bedienen und Beobachten", in English language "Controlling and Monitoring"), to a networked process control system.

In the case of conventional industrial field buses, for connecting equipment such as peripherals, operator control and monitoring devices, central units and many more besides to the field bus, long spur lines must be avoided. FIG. 1 shows a standard setup for a conventional connection of a device to a field bus, said device being connected to said field bus via a line driver and a spur line. The spur line must be kept as short as possible in order not to jeopardize data transmission on the bus. The line driver is connected to a field bus controller via three signal cables. The elements of the unit in question are connected to the field bus controller. These elements are not shown in FIG. 1 for the sake of clarity. There is provided an incoming and an outgoing signal cable for "Receive data" and "Transmit data" respectively. It is also possible to monitor the data traffic on the field bus via the incoming signal cable. For transmitting data from the field bus controller over the outgoing signal cable, activation of the line driver via an additional control signal is additionally necessary.

FIG. 2 again shows in detail a section of FIG. 1 in the area of the spur line, the two connector plugs for the line driver at the input and output of the field bus being shown. The spur line between the two connector plugs and the line driver must be kept as short as possible.

The invention will now be explained in greater detail with reference to exemplary embodiments. These are illustrated in the Figures briefly described below:

DETAILED DESCRIPTION OF INVENTION

Figure 1:
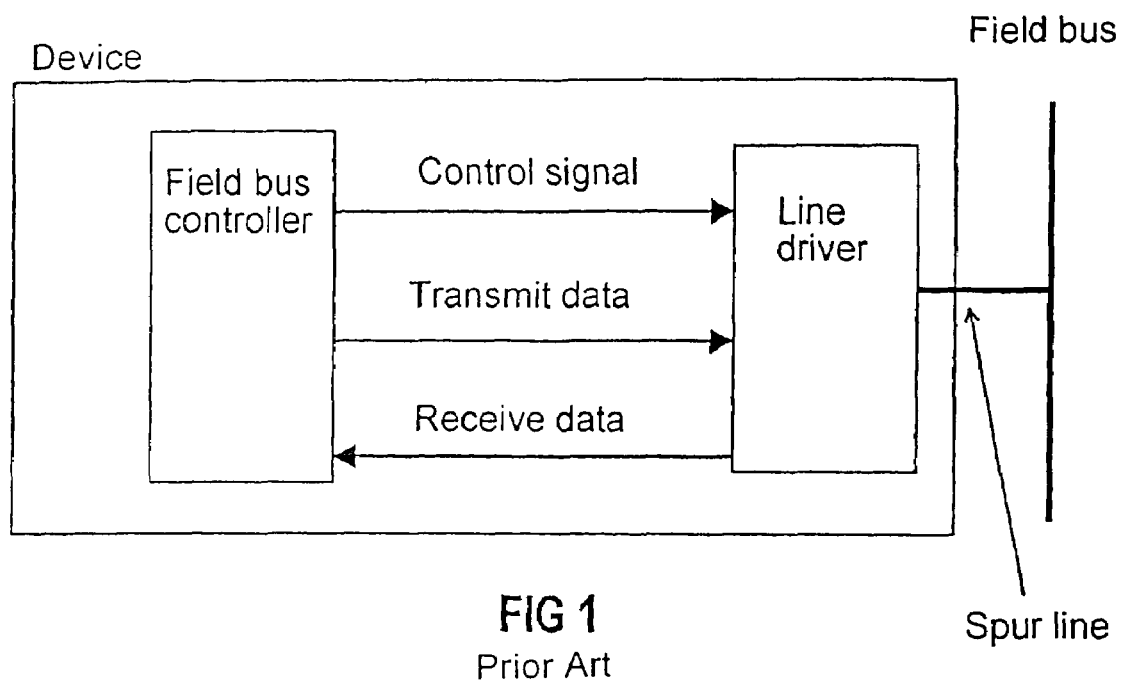
FIG. 1 shows the design of a field bus connection according to the prior art.
Figure 2:
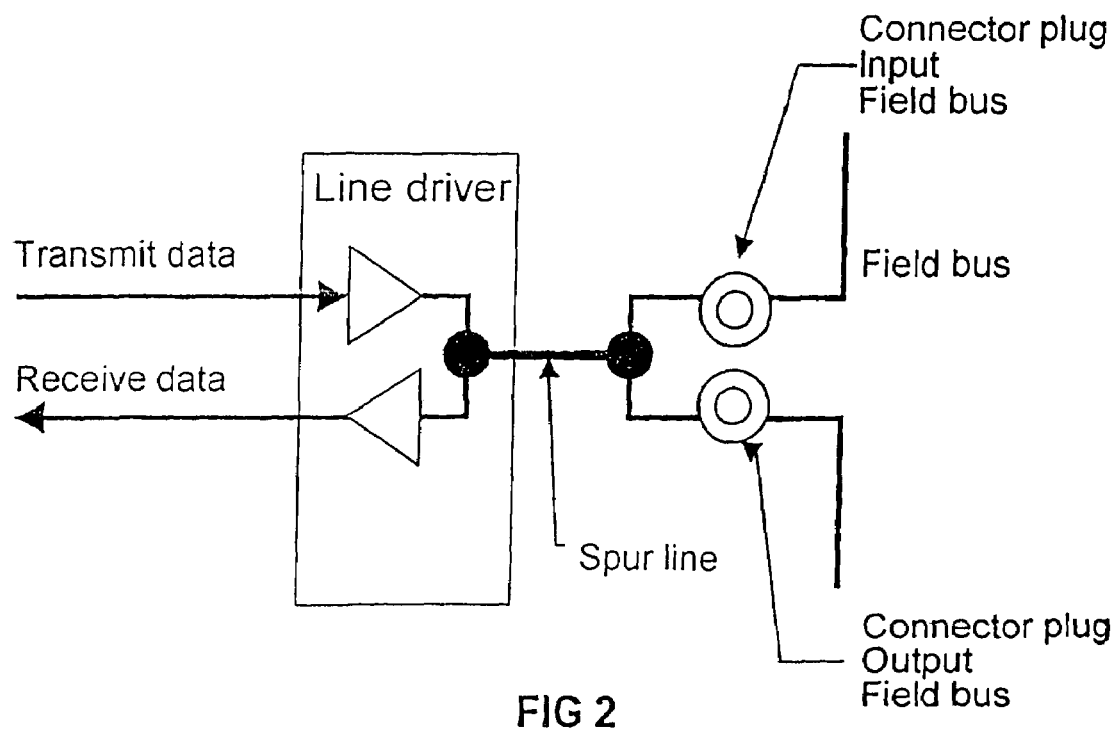
FIG. 2 shows a detail from FIG. 1 in the area of the spur line.
Figure 3:
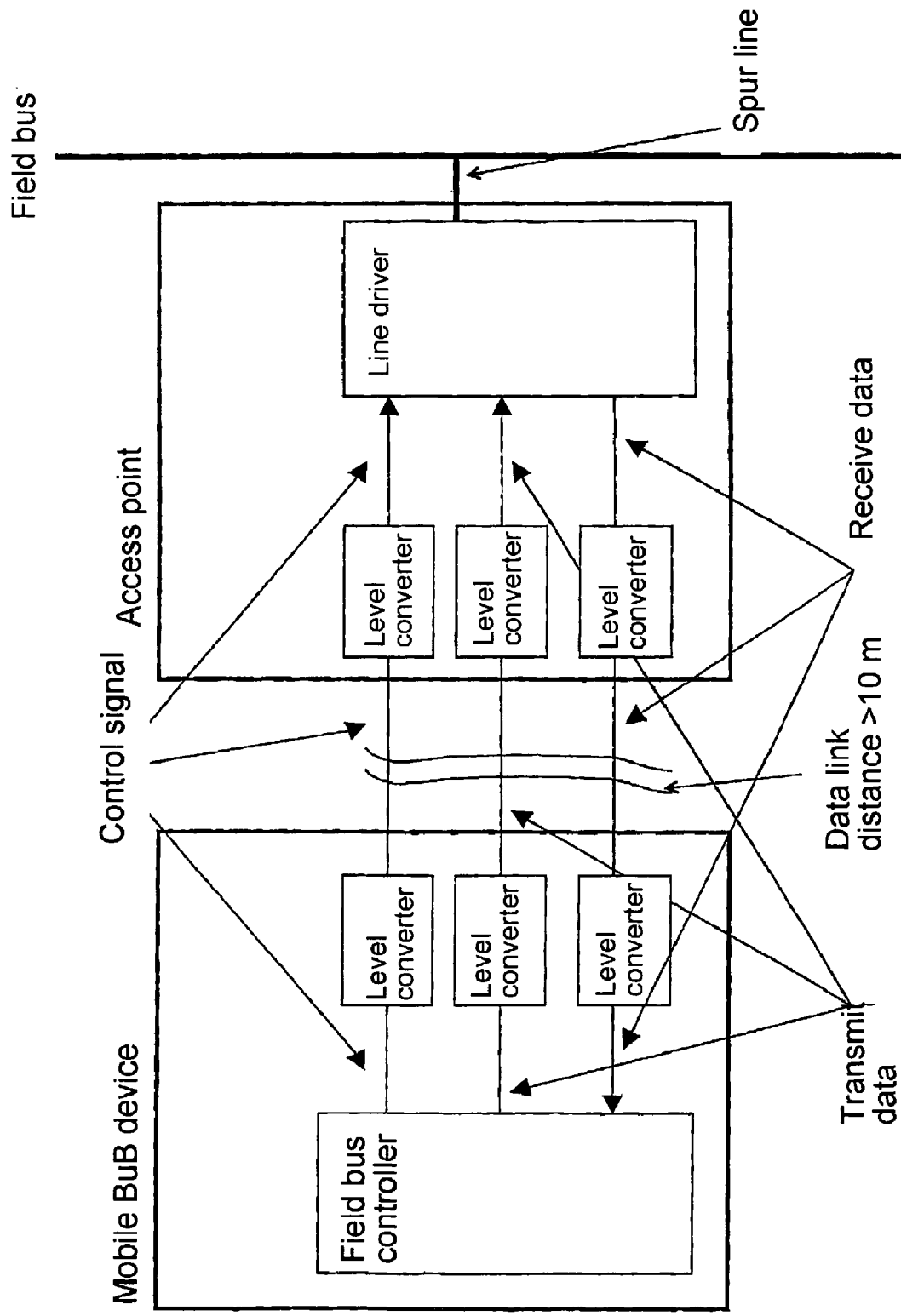
FIG. 3 shows a field bus connection according to the invention.

FIG. 3 shows a connection of a mobile device to a field bus according to the invention, the mobile operator control and monitoring device being connected to the field bus via a data link and an access point, the spur line indeed having a correspondingly short line length between field bus and the line driver located in the access point. An access point can also be termed a coupling unit. However, because of the advantageous embodiment of the mobile operator control and monitoring device on the one hand and of the access point on the other, the intervening data link can have considerably longer line lengths e.g. in excess of 10 meters. The coupling according to the invention as shown in FIG. 3 can also be termed "remote bus access".

The particularly advantageous lengthening of the data link is achieved according to the invention by interposing a level converter in each of the three signal lines for "Control signal", "Transmit data" and "Receive data" both at the mobile operator control and monitoring end and at the access point end. A control signal fed out by the field bus controller in the mobile operator control and monitoring device is therefore converted by a first level converter, converted back again by a second level converter after transmission over the signal link and only then fed to the line driver in the access point. In the same manner a pair of level converters is interposed in the signal line provided for "Transmit data" and in the signal line provided for "Receive data". In this way the mobile BuB device can be connected to the field bus via a very long data link, whereas only the access point is connected to the field bus via a correspondingly short spur line.

Into each of the three signal lines there is therefore inserted an additional point-to-point transmission link allowing physical decoupling of the mobile BuB device from the access point placed in the immediate proximity of the field bus.

In addition to the considerable lengthening of the signal line path over the data link, the arrangement according to the invention has the additional advantage that a BuB device can be dynamically plugged and unplugged again at an access point without adversely affecting data transmission on the field bus. In addition, it is particularly advantageous that virtually any number of access points can be distributed over a field bus.

Figure 4:
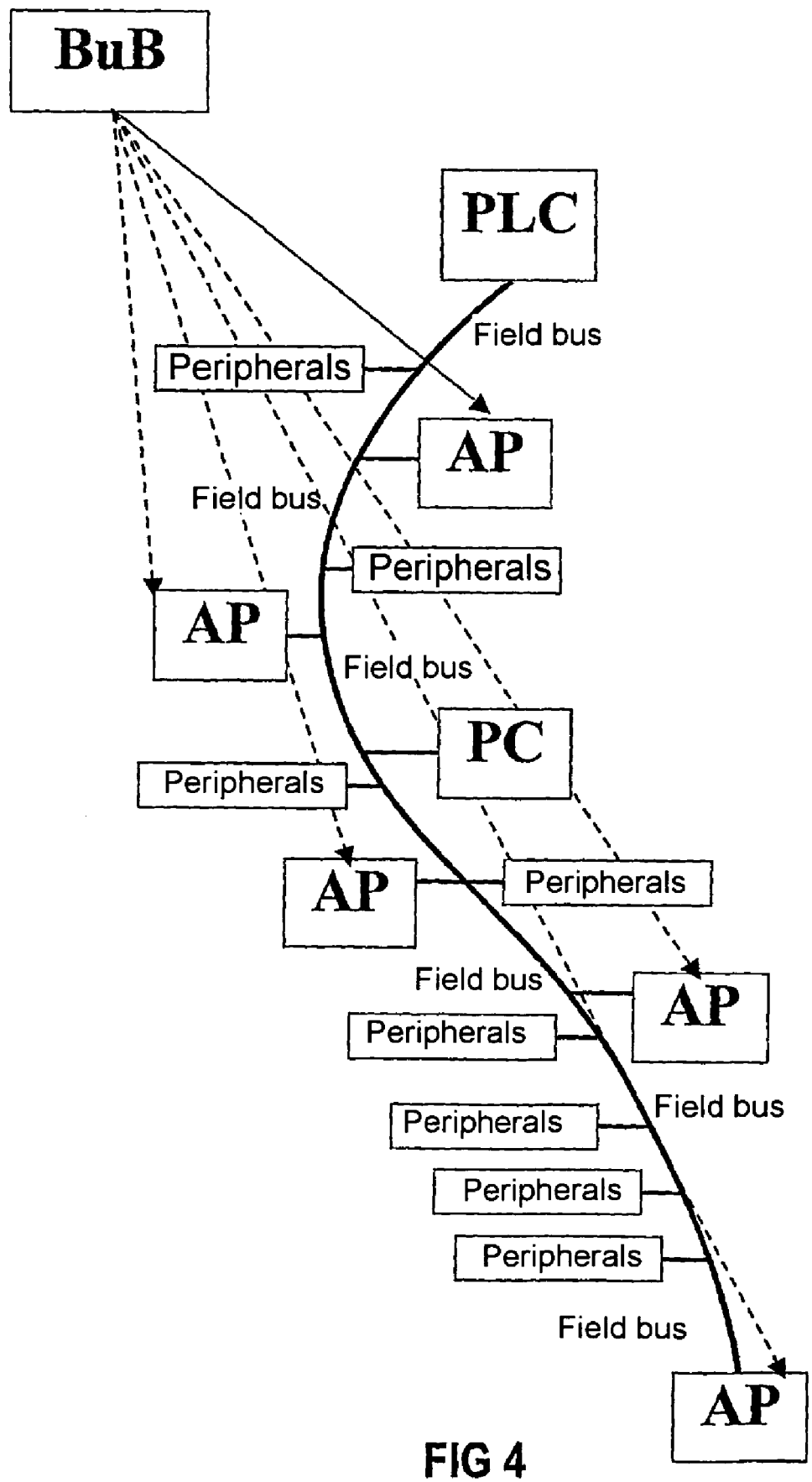
FIG. 4 shows an exemplary field bus equipped with a plurality of access points according to the invention.

By way of example, FIG. 4 shows a corresponding system configuration wherein a field bus is fed by a process logic control PLC, i.e. more specifically an industrial control. To the field bus there are connected a plurality of peripheral devices which have functions required in the relevant operating environment of the plant configuration illustrated. In many cases intelligent I/O modules are involved which enable data to be transferred to a connected installation unit. For the sake of clarity, no installation equipment is shown in FIG. 4. Moreover, an additional PC is connected to the field bus by way of example. This can assume the function of a control computer for performing, for example, diagnostics, archiving and connection e.g. to the Internet. Access points AP disposed in a distributed manner and according to the invention are connected to the field bus. It is now possible for a user to connect a BuB device to one of the access points as required. In a large industrial plant it is therefore no longer absolutely necessary to place stationary BuB devices in a distributed manner in order to ensure reliable operator control and monitoring of all the peripheral devices and installation units.

Instead a BuB can be connected to the access point AP in closest proximity to equipment to be controlled or monitored.

Figure 5:
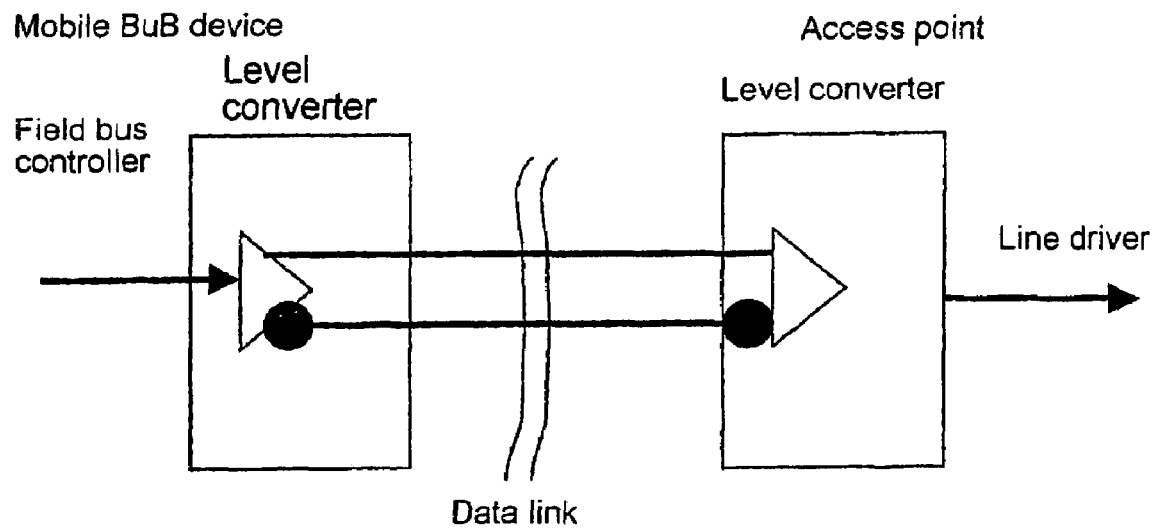
FIG. 5 shows an exemplary implementation of the data link based on differential signal transmission.

Advantageously the data link between two level converters in a signal line is in the form of a differential transmission link. By way of example, FIG. 5 shows a differential signal transmission link of this kind for a signal line. This usually consists of a line pair in each case. In each signal line there is therefore interposed a point-to-point connection which allows highly interference-free transmission of data on the line pair. The critical factor for transmission quality is the differential signal level and not the absolute value of the individual signals. Thus interference coupled onto the two lines of the data link between the level converters usually cancels itself but.

Figure 6:
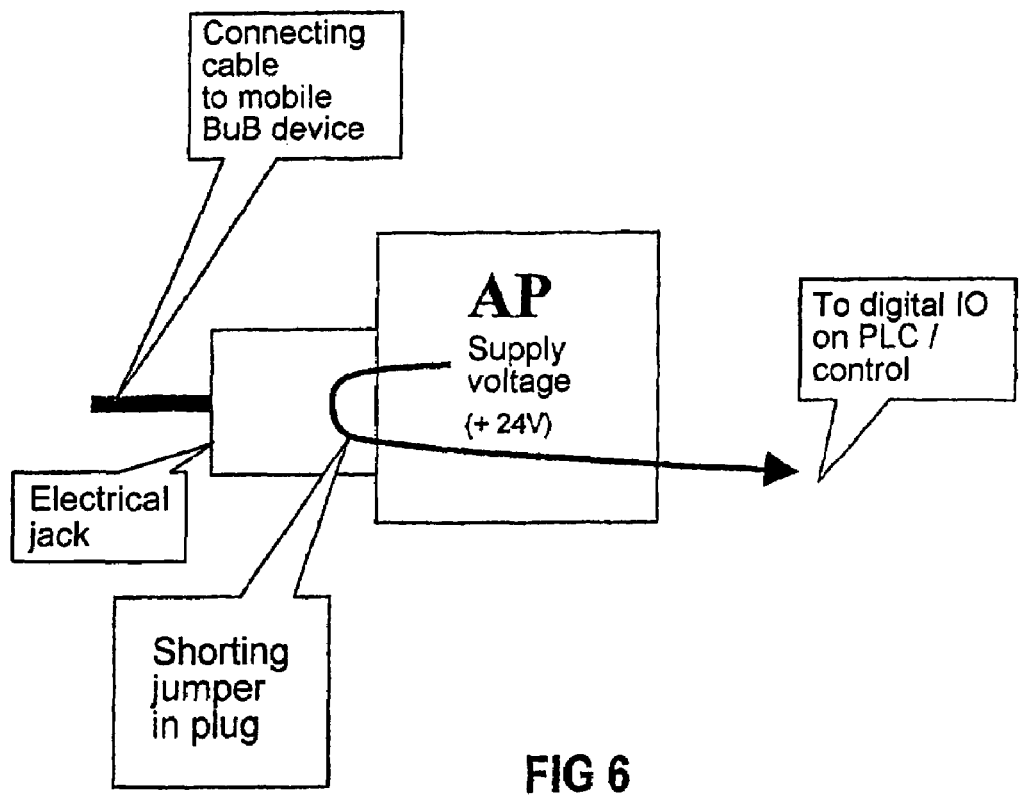
FIG. 6 shows an advantageous embodiment for present detection of a BuB device connected to an access point.

Because of the invention according to the invention, a mobile BuB device can therefore be connected to different access points AP. Via so-called present detection at each AP it can be detected where the mobile BuB device has been connected. A possible implementation of present detection of this kind is illustrated in FIG. 6. For this purpose each access point AP is connected to the higher-order PLC via an additional signal line. This can detect via this preferably digital line whether a BuB device is connected to the access point AP. In addition, the PLC can also transmit via the present detection system a selection of views to the particular BuB device connected, which are offered to the BuB device at the relevant access point.

The invention claimed is:

1. A system for connecting a mobile data unit to a field bus, comprising:
    a coupling unit connected to the field bus via a spur line and a line driver, wherein signals at an output of the line driver are injected via a first level converter in the coupling unit into a first data link or are received from the first data link;
    a mobile data unit receiving the signals via a first level converter in the mobile data unit from the first data link or injecting the signals into the first data link;
    the first data link connected to the first level converter in the coupling unit via an electrical jack for communicating data between the mobile data unit and the field bus;
    a presence detection circuit comprising a digital signal line providing a presence signal responsive to coupling of the mobile data unit to the coupling unit; and
    a local controller connected to the field bus and connected to the presence detection circuit for receiving the presence signal, wherein the local controller can transmit a selection of views to the mobile data unit via the digital signal line.

2. The system as in claim 1, wherein the presence detection circuit comprises an additional signal line, and the local controller can transmit a selection of views to the mobile data unit via the additional signal line.

3. The system according to claim 1, further comprising;
    second and third level converters in the coupling unit connected to the line driver for data communication therewith;
    a second data link connected to the second level converter in the coupling unit via said electrical jack for communicating data between the mobile data unit and the field bus;
    a third data link connected to the third level converter in the coupling unit via said electrical jack for communicating control signals between the mobile data unit and the line driver; and
    wherein each level converter converts an electrical signal between a short range electrical signal provided to or from the line driver and a longer range electrical signal provided to or from the respective data link.

4. A system for connecting a mobile data unit to a field data bus, comprising;
    a line driver connected to the field data bus for data communication therewith;
    first, second, and third line signal level converters connected to the line driver for data communication therewith;
    a first data communication link connected to the first line signal level converter via an electrical jack for communicating data between the mobile data unit and the field data bus;
    a second data communication link connected to the second line signal level converter via said electrical jack for communicating data between the mobile data unit and the field data bus;
    a third data communication link connected to the third line signal level converter via said electrical jack for communicating control signals between the mobile data unit and the line driver;
    each line signal level converter converting an electrical signal between a short range electrical signal provided to or from the line driver and a longer range electrical signal provided to or from the respective data communication link;
    the respective data communication links comprising a connecting cable for selectively connecting the mobile data unit to the field data bus;
    a presence detection circuit providing a presence signal responsive to connection of the mobile data unit to the field data bus via the connecting cable; and
    a local controller connected to the field data bus and receiving the presence signal;
    wherein the presence detection circuit comprises a digital signal line, and the local controller can transmit a selection of views to the mobile data unit via the digital signal line.

* * * * *